US009039535B2

(12) United States Patent
Boss et al.

(10) Patent No.: US 9,039,535 B2
(45) Date of Patent: *May 26, 2015

(54) TOOL EMPLOYING DYNAMIC COMPETITION LEVELS FOR IMPROVED PERFORMANCE

(75) Inventors: Gregory Jensen Boss, Saginaw, MI (US); Michele Palladino Brignull, Essex Junction, VT (US); Rick Allen Hamilton, II, Charlottesville, VA (US); Brian Marshall O'Connell, RTP, NC (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 429 days.

This patent is subject to a terminal disclaimer.

(21) Appl. No.: 13/275,303

(22) Filed: Oct. 17, 2011

(65) Prior Publication Data
US 2013/0095928 A1    Apr. 18, 2013

(51) Int. Cl.
A63F 9/24        (2006.01)
G06Q 10/06       (2012.01)

(52) U.S. Cl.
CPC ............ *A63F 9/24* (2013.01); *G06Q 10/06398* (2013.01)

(58) Field of Classification Search
CPC ........................................................ A63F 9/24
USPC ....................... 463/23, 42, 43; 705/7.38, 7.42
See application file for complete search history.

(56) References Cited

U.S. PATENT DOCUMENTS

| 7,216,088 | B1 | 5/2007 | Chappel |
| 7,811,200 | B2 | 10/2010 | Chiang |
| 7,827,265 | B2 | 11/2010 | Cheever |
| 7,846,024 | B2 | 12/2010 | Graepel |
| 7,877,266 | B2 | 1/2011 | Brydon |
| 7,997,987 | B2 | 8/2011 | Johnson |
| 2006/0258421 | A1 | 11/2006 | Nicholas |
| 2007/0066403 | A1* | 3/2007 | Conkwright .................... 463/43 |
| 2007/0265718 | A1 | 11/2007 | Graepel |
| 2008/0114845 | A1 | 5/2008 | Rao |
| 2009/0254358 | A1 | 10/2009 | Li |
| 2009/0259485 | A1 | 10/2009 | Perlman |
| 2010/0036912 | A1 | 2/2010 | Rao |
| 2010/0248901 | A1 | 9/2010 | Martens |

(Continued)

FOREIGN PATENT DOCUMENTS

WO    WO0250721 A2    6/2002

OTHER PUBLICATIONS

WebRacing1—"Web Racing", Downloaded from http://www.fitcentric.com/html/web_racing.htm (Copyright 2007).

(Continued)

*Primary Examiner* — Paula A D'Agostino
(74) *Attorney, Agent, or Firm* — Damion Josephs; Mark P. Kahler

(57) ABSTRACT

A dynamic competition tool varies the competition level that one or more competing users experience while working to reach a goal or objective. The dynamic competition tool receives performance information from each of a number of activity stations with which respective users may interact to achieve a goal. The dynamic competition tool commands a user interactive device within an activity station to vary the level of difficulty experienced by the user of the interactive device as that user progresses toward the goal.

5 Claims, 12 Drawing Sheets

(56) References Cited

U.S. PATENT DOCUMENTS

2011/0087430 A1   4/2011  Boss
2011/0237317 A1   9/2011  Noonan

OTHER PUBLICATIONS

WebRacing2—"WebRacing is Coming!", Press Release, instylefitness.co.uk (Apr. 2009).
WebRacing3—Yahoo—Finance, Press Release "Web Racing on FitnessHeaven.com—the Only Online Bike Racing Available", (Feb. 6, 2001).
WebRacing4—"WebRacing: How it Works", FitCentric Technologies (2009).
WebRacing5—"Online Racing for Bike, Rower and Runner—A Motivation Revolution", downloaded from www:webracing.co.uk on Oct. 13, 2011.
Baykasoglu—"Project Team Selection Using Fuzzy Optimization Approach", Cybernetics and Systems: An International Journal, 38: pp. 155-185 (2007).
Daumcnet—Michael Kanellos—"Race Cyclists Around the World From Your Garage", Downloaded from http://www.youtube.com/watch?v=4rJfa1iYAQM on Sep. 7, 2011 (transcript pp. 1-4).
Daum—"Daum Ergo_Bike Premium 8i tem No. 9190282", pp. 1-3, Downloaded from http://www.sport-tiedje.co.uk/en/Daum-ergo_bike-Premium-8i-9190282 on Sep. 3, 2011.
Ehealth—"Losing Weight With Cool Web-Biking", pp. 1-5, Downloaded from http://www.blubberbuster.com/WEB-BIKERS_teens.htm on Sep. 3, 2011.
Hsieh—"Cross-Functional Team Selection Concerning Members' Cooperative Effects and Capabilities Overlap", Research Paper, Systems Research and Behavioral Science, Published in Wiley Inter Science, pp. 301-318, (Sep. 28, 2009).
Mehta—"National Design Competition: Accessible Ergometer", Department of Biomedical Engineering University of Wisconsin—Madison, pp. 1-57 (Jun. 1, 2005).
Mgmthub—"How to Form a Professional Quality Project Management Team?", Downloaded from http://www.management-hub.com/project-management-team.html, pp. 1-2, (2005).
Prosci—"BPR OnLine Learning Center", Downloaded http://www.prosci.com/team_selection.htm, pp. 1-4, (Aug. 9, 2011).
Saenz—"Video Game Exercise Bikes Ride onto the Social Network", Downloaded from http://singularityhub.com/2010/12/06/video-game-exercise-bikes-ride-onto-the-social-network/, pp. 1-5, (Dec. 6, 2011).
Spotty—"Selecting the team", Downloaded http://www.spottydog.u-net.com/guides/start/start.html, pp. 1-4, (Aug. 9, 2011).
Zhang—"Optimization Model for Team and Member Selection in Mathematical Contest in Modeling", 2010 International Conference on Future Information Technology and Management Engineering, Changzhou, China; pp. 60-63, (Oct. 9, 2010).
Hunicke—"AI for Dynamic Difficulty Adjustment in Games", Proceedings of the Challenges in Game AI Workshop, Nineteenth National Conference on Artificial Intelligence, Menlo Park, CA (2004).

* cited by examiner

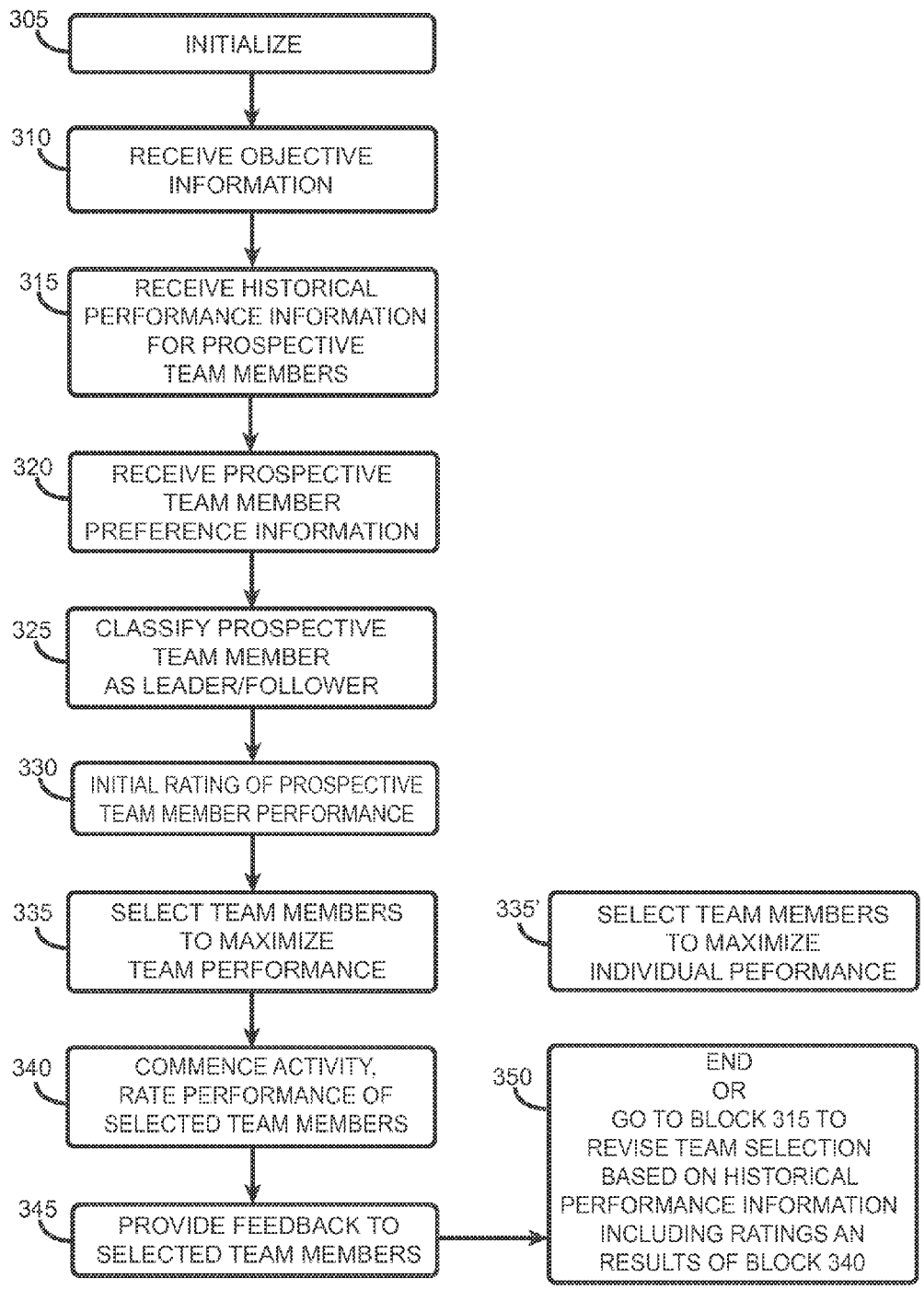

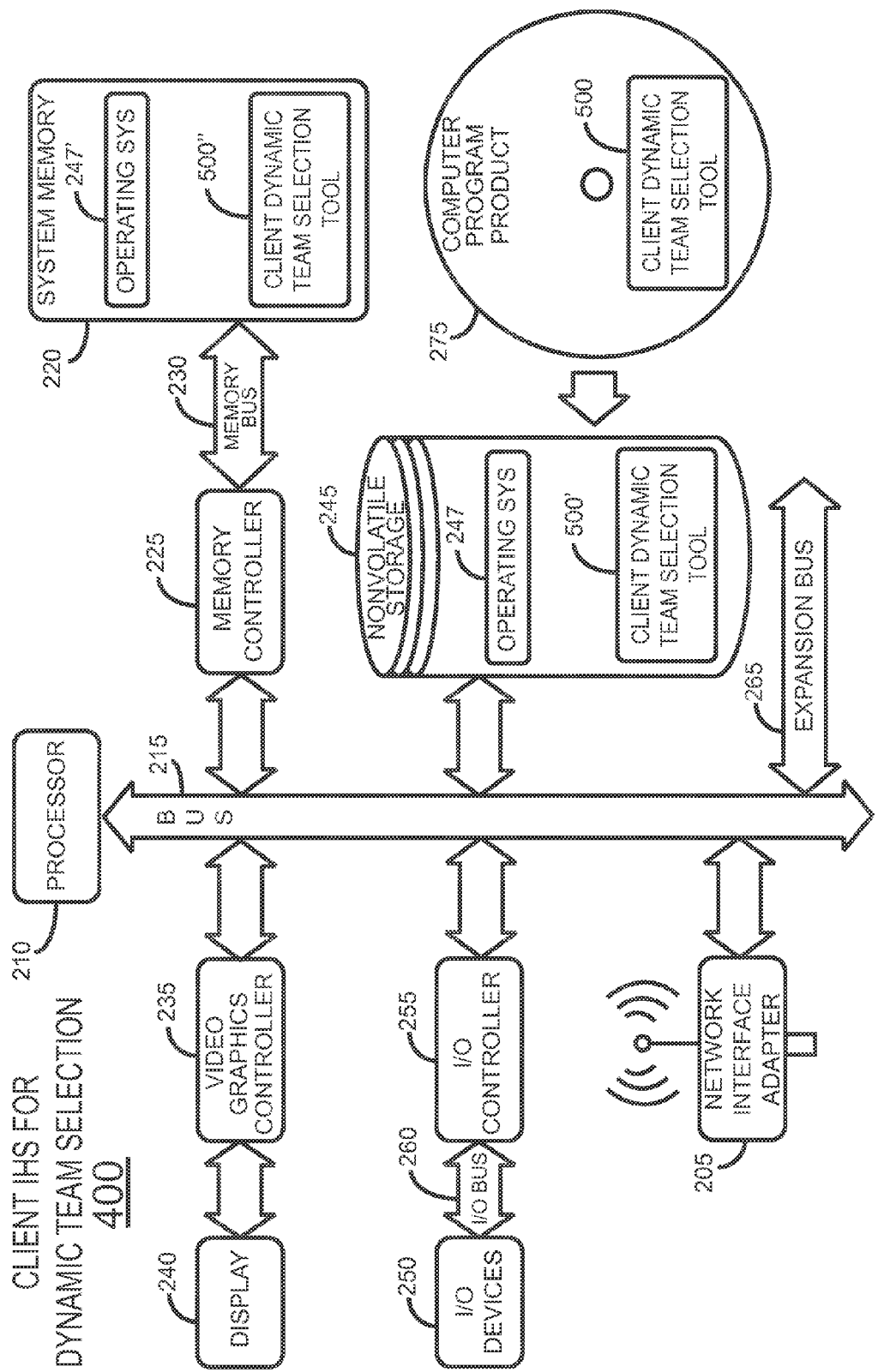

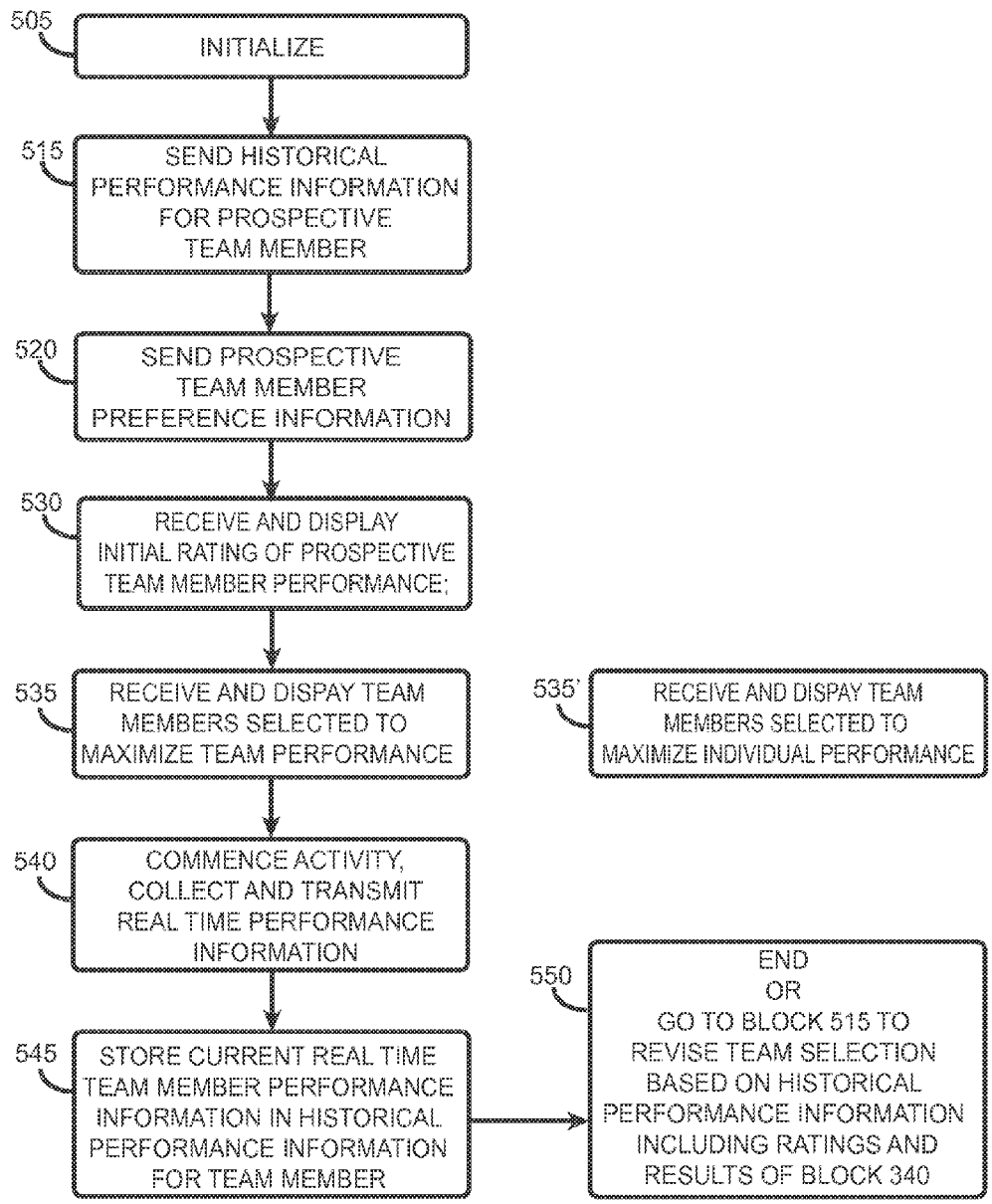

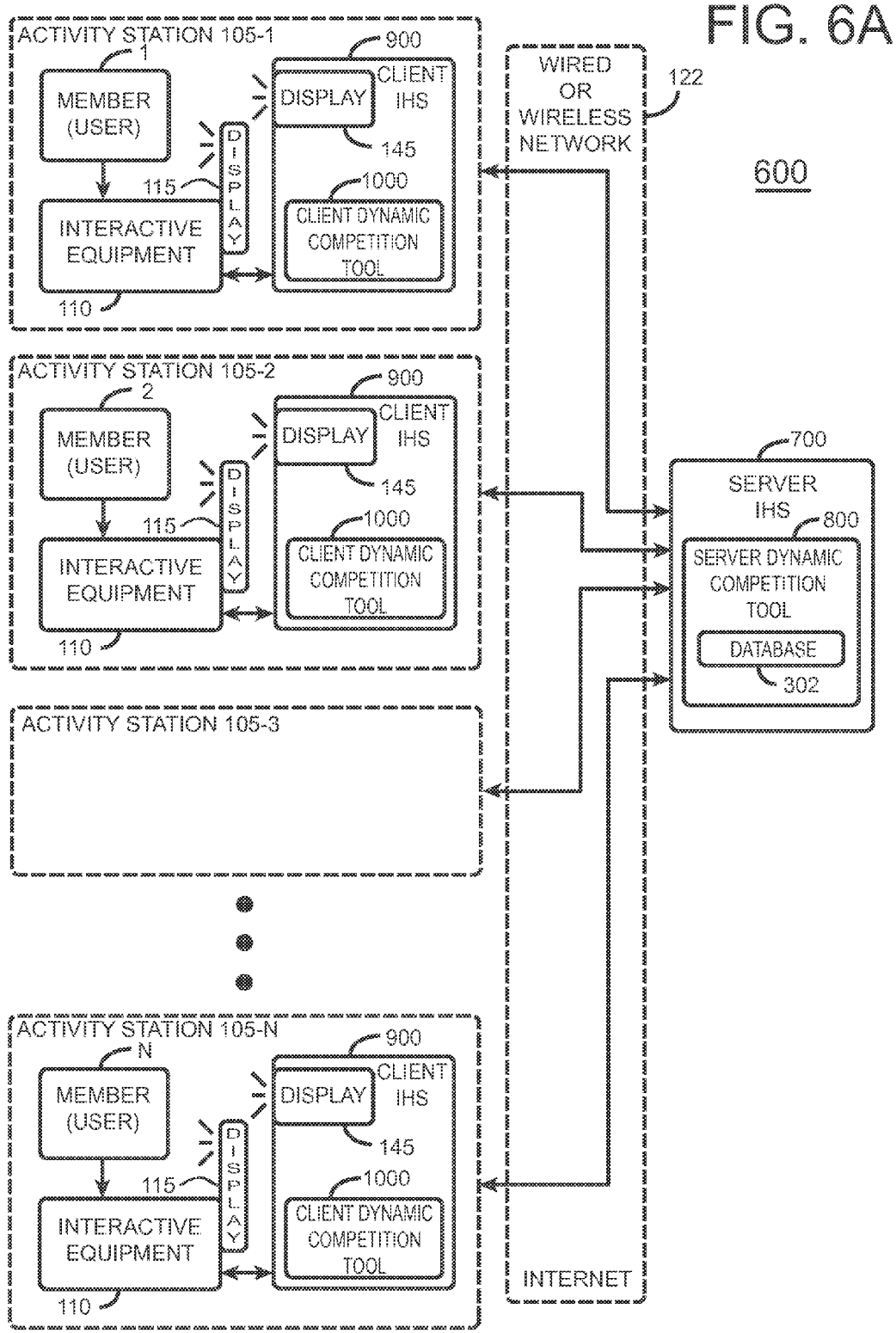

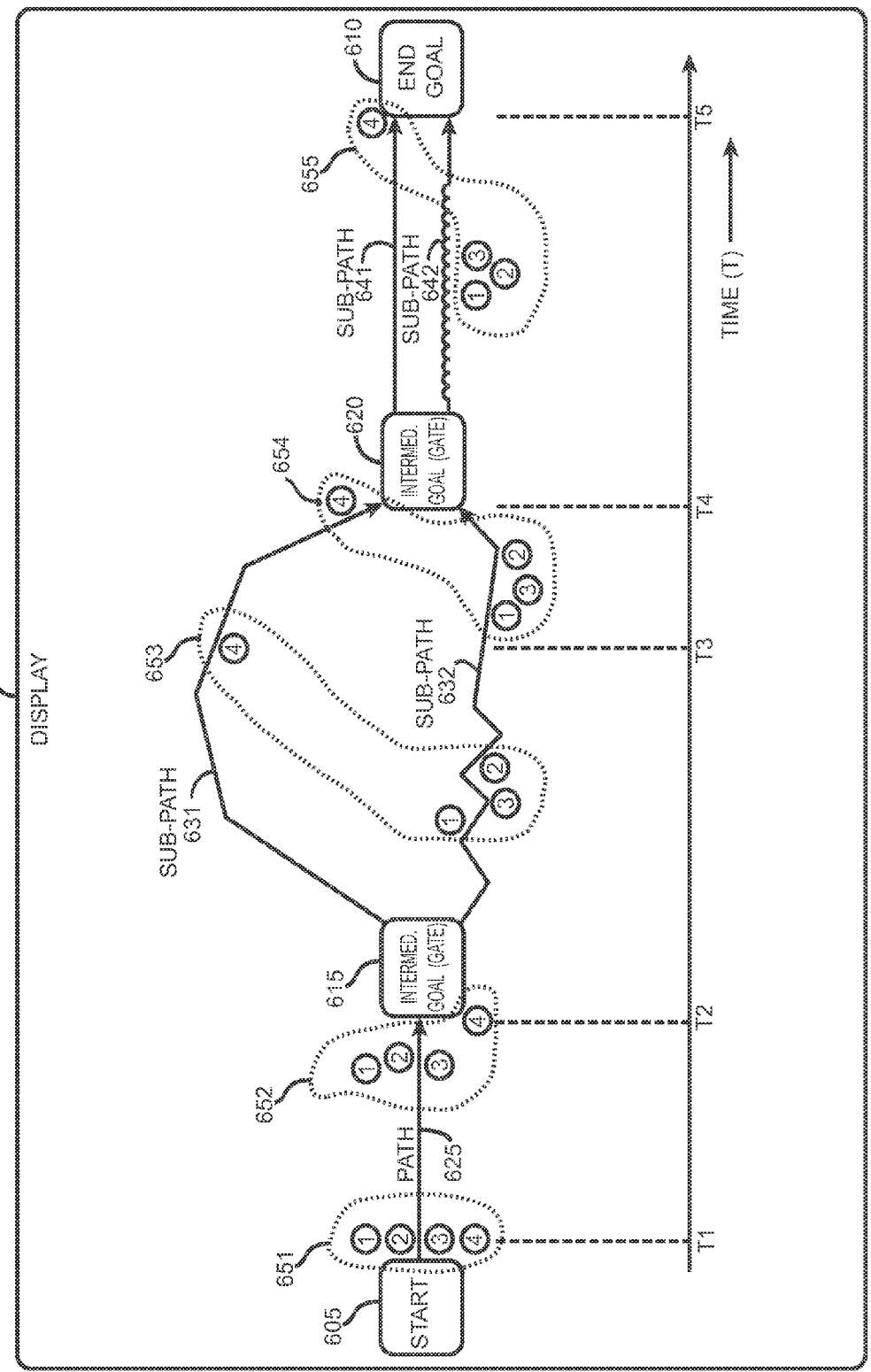

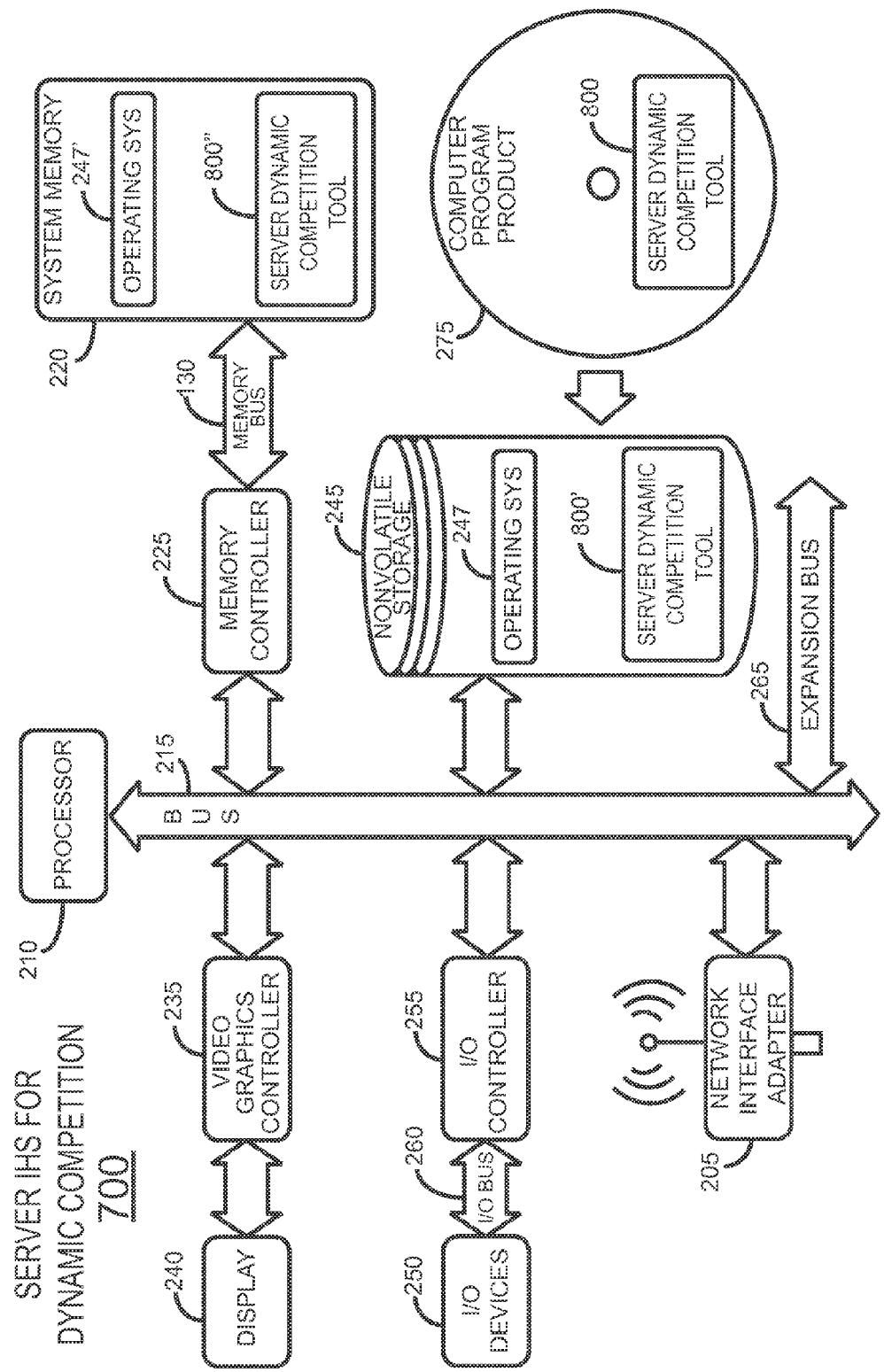

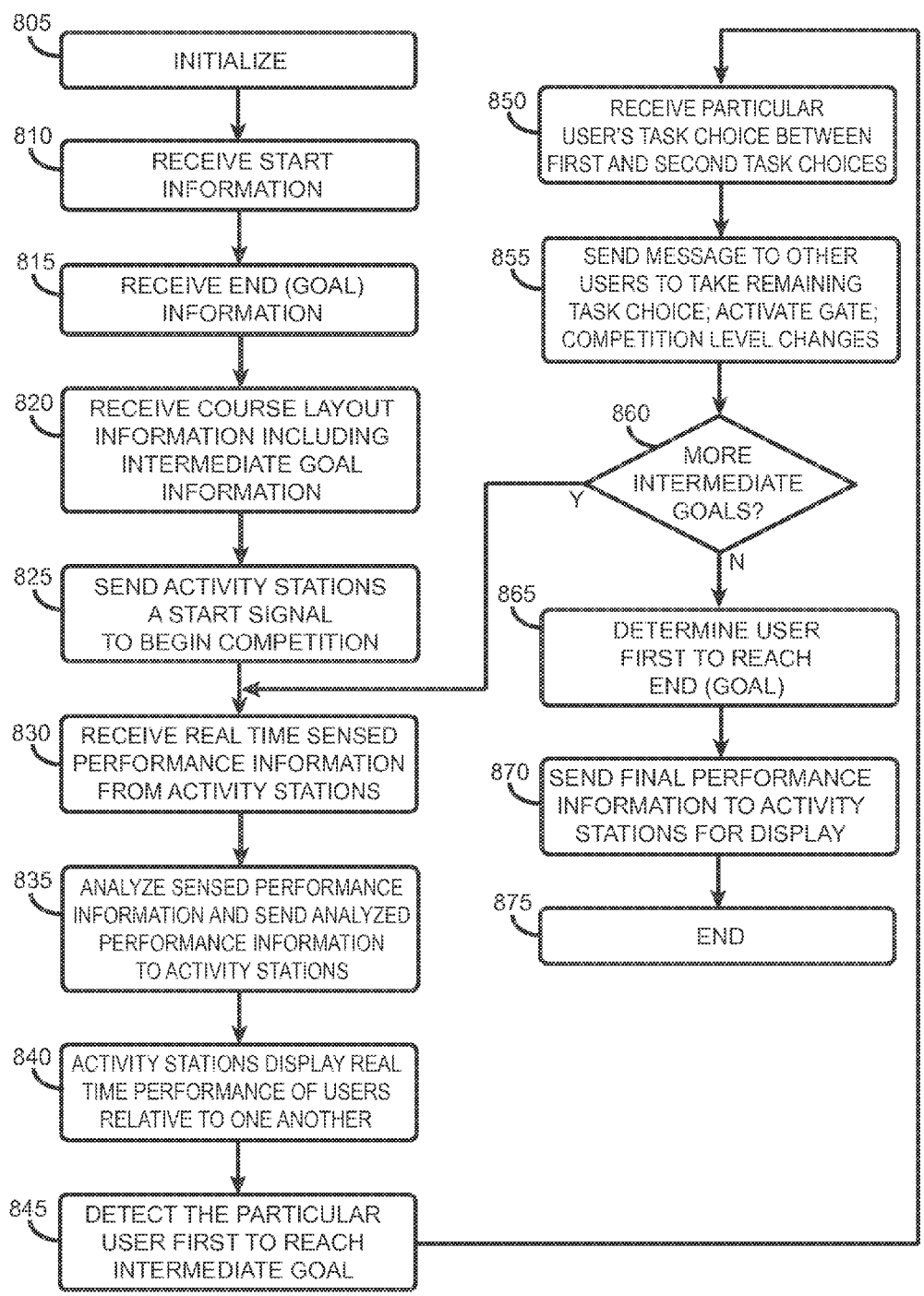

TOOL EMPLOYING DYNAMIC COMPETITION LEVELS FOR IMPROVED PERFORMANCE

CROSS REFERENCE TO RELATED PATENT APPLICATIONS

This patent application is related to the copending patent application entitled "Tool For Dynamic Team Selection For Improved Performance" by Boss, et al., Ser. No. 13/275,291, filed concurrently herewith and assigned to the same Assignee, the disclosure of which is incorporated herein by reference in its entirely.

FIELD OF THE INVENTION

The disclosures herein relate generally to information handling systems (IHSs), and more specifically, to IHSs that interact with users on teams.

BACKGROUND

People form teams or groups for many different purposes. People typically form teams to jointly perform one or more goal-based activities. Although working in a team environment is often beneficial with respect to improving morale and performance toward a particular goal, many activities that could be performed by a team are still performed by individuals. When teams are created, they are often manually created in an ad-hoc and non-optimal manner.

BRIEF SUMMARY

In one embodiment, a method is provided for objectively selecting a team by a team selection tool. The method includes receiving, by the team selection tool, goal information including a team goal. The method also includes receiving, by the team selection tool, historical performance information for each of a plurality of prospective team members, the historical performance information relating to tasks to be performed to achieve the team goal. The method further includes selecting, by the team selection tool, a subset of the prospective team members as selected team members in response to the historical performance information and the goal information, thus providing an objective selection of team members. In one embodiment of the disclosed method, the team selection tool selects prospective team members as selected team members for positions on the team wherein the selected team members will perform best to achieve the team goal, as indicated objectively by the historical performance information. In another embodiment of the disclosed method, the team selection tool selects a prospective team member as a selected team member to a position on the team wherein the selected team member will objectively perform best as an individual toward achievement of the team goal.

In another embodiment, an information handling system (IHS) is disclosed that includes a processor and a memory coupled to the processor. The memory is configured with a team selection tool that receives goal information including a team goal. The team selection tool receives historical performance information for each of a plurality of prospective team members, the historical performance information relating to tasks to be performed to achieve the team goal. The team selection tool selects a subset of the prospective team members as selected team members in response to the historical performance information and the goal information, thus providing an objective selection of team members.

In yet another embodiment, a team selection tool computer program product is disclosed that includes a computer readable storage medium. The team selection tool computer program product includes first program instructions that receive goal information including a team goal. The computer program product also includes second program instructions that receive historical performance information for each of a plurality of prospective team members, the historical performance information relating to tasks to be performed to achieve the team goal. The computer program product also includes third program instructions that select a subset of the prospective team members as selected team members in response to the historical performance information and the goal information, thus providing an objective selection of team members. The first, second and third program instructions are stored on the computer readable storage medium.

In one embodiment, a method is provided wherein a dynamic competition management tool dynamically varies competition levels or difficulty levels experienced by users along a path between a start point and an end goal. The method includes providing a plurality of activity stations to a plurality of users, wherein each user interacts with a respective activity station in pursuit of an end goal. The method also includes receiving, by the dynamic competition management tool, end goal information that defines the end goal. The method further includes sensing, by each activity station, performance information of the respective user of the activity station in pursuit of the end goal, thus providing sensed performance information. The method still further includes receiving, by the dynamic competition management tool, sensed performance information from each of the activity stations. The method also includes sending, by the dynamic competition management tool, a command to a user interactive device in a particular activity station to vary a level of difficulty that the user of the particular activity station experiences as the user of the particular activity station progresses toward the end goal.

In another embodiment, an information handling system (IHS) is disclosed that includes a processor and a memory coupled to the processor. The memory is configured with a dynamic competition management tool that communicates with a plurality of activity stations for a plurality of users, wherein each user interacts with an interactive device in a respective activity station in pursuit of an end goal. The dynamic competition management tool receives end goal information that defines the end goal. The dynamic competition management tool also receives from the activity stations sensed performance information of the respective users of the activity stations in pursuit of the end goal. The dynamic competition management tool also sends a command to a user interactive device in a particular activity station to vary a level of difficulty that the user of the particular activity station experiences as the user of the particular activity station progresses toward the end goal. In one embodiment, dynamic competition management tool receives intermediate goal information that defines an intermediate goal between a start point and the end goal, a path being defined between the start point and the intermediate goal. The dynamic competition management tool also receives sub-path information that defines a first sub-path between the intermediate goal and the end goal, the sub-path information further defining a second sub-path between the intermediate goal and the end goal.

In another embodiment, a dynamic competition management tool computer program product is disclosed that includes a computer readable storage medium. The computer program product includes first program instructions that communicate with a plurality of activity stations for a plurality of users, wherein each user interacts with an interactive device in a respective activity station in pursuit of an end goal. The computer program product also includes second program instructions that receive end goal information that defines the end goal. The computer program product further includes third program instructions that receive from the activity stations sensed performance information of the respective users of the activity stations in pursuit of the end goal. The computer program product still further includes fourth program instructions that send a command to a user interactive device in a particular activity station to vary a level of difficulty that the user of the particular activity station experiences as the user of the particular activity station progresses toward the end goal. The first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a flowchart of process flow in the disclosed server dynamic team selection tool.

FIG. 4 is a block diagram of the disclosed client IHS including a client dynamic team selection tool.

FIG. 5 is a flowchart of process flow in the disclosed client dynamic team selection tool.

FIG. 6A is a block diagram of one embodiment of the disclosed system that may provide dynamic competition to users.

FIG. 6C is a display showing snapshots in time of the relative positions of users competing to reach the end goal.

FIG. 7 is a block diagram of one embodiment of the disclosed server IHS including a server dynamic competition tool that may provide dynamic competition.

FIG. 8 is a flowchart of process flow in the disclosed server dynamic competition tool.

DETAILED DESCRIPTION

Figure 1:
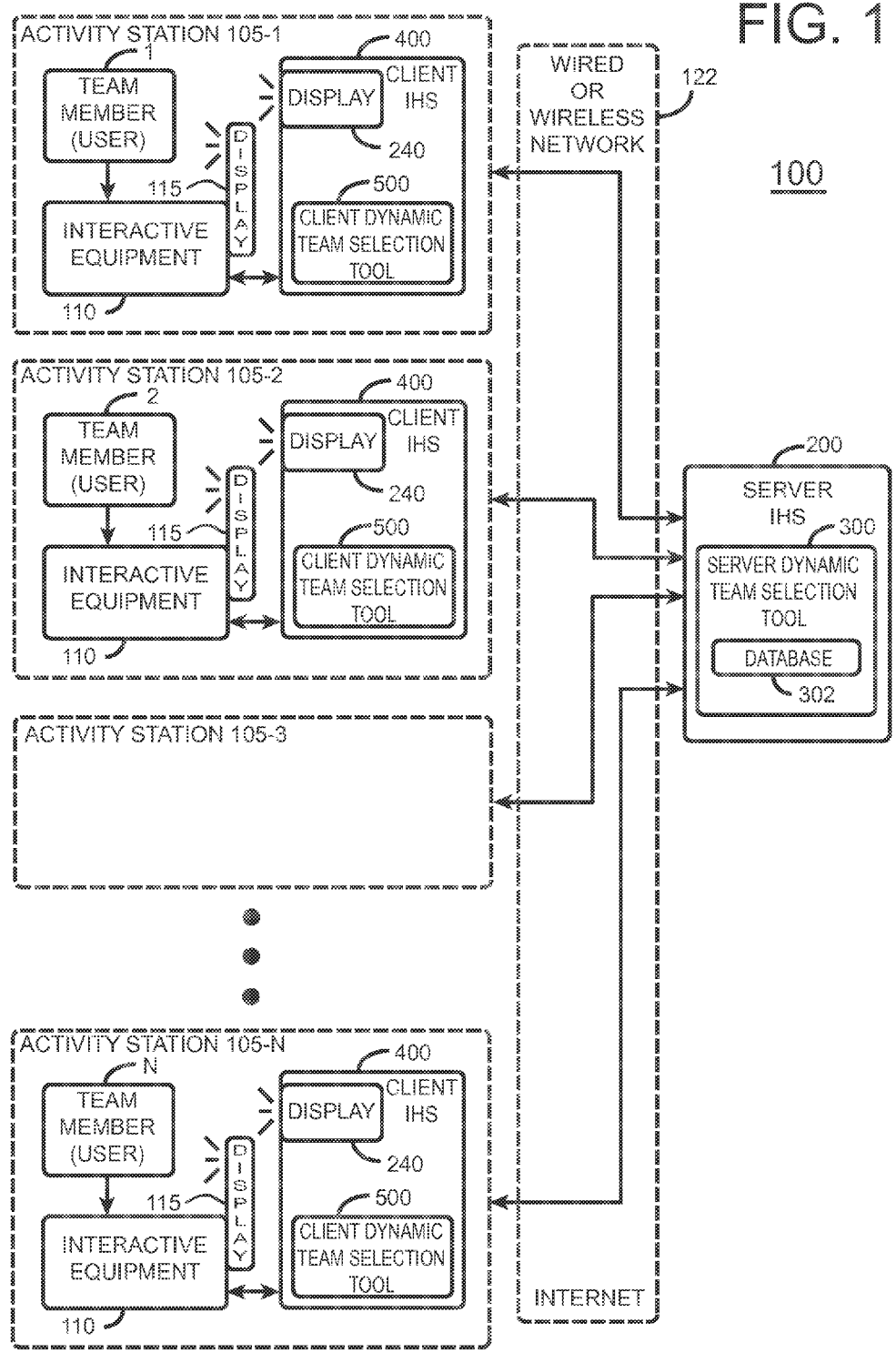
FIG. 1 is a block diagram of one embodiment of the disclosed team selection system that may provide dynamic team selection.

Teams or groups may form on an ad-hoc basis to work toward a particular common goal. For example, one or more human organizers may manually select team members to achieve the goal. Such a common goal may include designing a hardware and/or software product, manufacturing a product, an athletic goal such as encountered in team sports, a physical exercise goal and other goals where team members work together to achieve a common end. One embodiment of the disclosed team selection tool may objectively select team members who will work together to achieve the common goal. The team selection tool may intelligently select team members who will optimize the team's overall performance. Alternatively, the team selection tool may intelligently select team members in an objective manner that increases or optimizes the individual performance of one or more team members. The tool may objectively match an individual with a team position that best fits the individual's historical performance. In another embodiment, a dynamic competition tool may intelligently dynamically vary the competition level that group members or users experience as they work to achieve a goal.

When teams are manually formed in an ad-hoc manner to achieve a goal, frequently the person who selects the team members does not select team members who will optimize overall team performance in comparison with a predetermined baseline team performance. Moreover, the person who manually selects the team members may not select team members in a manner that increases and/or optimizes individual team member performance in comparison with a predetermined baseline individual performance as one embodiment of the disclosed tool does.

While applicable to many different types of teams such as design teams, project teams and other teams, the disclosed representative embodiment is discussed in terms of a team that is formed to achieve an athletic goal. Depending on the personality of the individual team member, performance may be enhanced through competition and/or teamwork by measuring how well different prospective team members and selected team members perform the same task. In one embodiment, a network couples multiple performance monitoring client IHSs in activity stations together and to a common server IHS. Each client IHS couples to respective interactive equipment such as an exercise device. A respective team member interacts with each client IHS and interactive equipment to perform a task that relates to the team goal. The client IHS measures team member performance and sends real time performance information to the common server IHS. The common server IHS collects and analyzes the team member performance information of each team member that the server IHS receives from the client IHSs. In one embodiment, each team member's client IHS includes a display that enables the team member to observe that team member's progress toward the goal relative to the progress of other team members toward the goal. A team member may observe how that team member's performance compares with the performance of another team member. Alternatively, the team member may observe on the display how that team member's performance compares with the performance of the entire team or a portion of the team. Alternatively, the team member may observe on the display the performance of his or her team with respect to the progress of other teams toward the goal.

In another embodiment, the server IHS includes a dynamic competition tool that receives and stores preference information for members of a group who will compete against each other to achieve a goal. The members of this group need not necessarily be associated or affiliated with one another. The dynamic competition tool of the server IHS also receives goal information descriptive of the goal. Similar to the embodiment described above, each member interacts with interactive equipment at a respective client IHS to perform a task related to the goal. The dynamic competition tool of the server IHS may also receive historic member performance information from the client IHSs or other sources. The dynamic competition tool of the server IHS is configured to dynamically change the competition level that a particular member or members may experience during the course of team competition in response to achievement of one or more intermediate goals by one or more members. The dynamic competition tool of the server IHS monitors member performance as the members progress in their exercise performance in furtherance of the goal. The dynamic competition tool of the server IHS may report competition results back to the client IHS so that each member may see that member's performance in comparison with the performances of other members. In one embodiment, the dynamic competition tool of the server IHS may continually modify the performance level requested of each member. In other words, the performance level requested of each member by the dynamic competition tool may be unique and different from the performance levels requested of other members. In an alternative embodiment, the dynamic competition tool of the server IHS may dynamically vary the competition that a particular team of members experiences when that particular team of members competes against one or more other teams of members. The dynamic competition tool of the server IHS may analyze the performance of each member of the particular team to select a revised team that maximizes individual team member performance and/or overall team performance.

FIG. 1 depicts a team selection system 100 that is useful for selecting teams in a manner that may improve individual team member performance and/or aggregate team performance. Team selection system 100 includes activity stations 105-1, 105-2, 105-3, . . . 105-N, wherein N is the total number of activity stations within the system. Users 1, 2, 3, . . . N represent the respective users of activity stations 105-1, 105-2, 105-3, . . . 105-N. In this embodiment, N represents the total number of activity stations 105 as well as the number of users. Activity station 105-1 is representative of the activity stations in system 100 and will thus be described in detail. Activity station 105-1 includes interactive equipment 110 that couples to a display 115. User 1 may physically interact with interactive equipment 115 in furtherance of a team goal. In one embodiment, interactive equipment 110 may be an exercise machine including an ergometer that measures the work that user 1 performs in furtherance of a team goal. Interactive equipment 110 may be a bicycle, treadmill, rowing machine or other machine with which the user interacts in furtherance of a team goal.

Interactive equipment 110 measures the performance that user 1 exhibits toward achievement of a goal. For example, in an embodiment wherein interactive equipment 110 is a bicycle type exercise machine, interactive equipment 110 may measure performance criteria of user 1 such as total distance run, speed, heart rate, cadence, work output in real time as well as other performance criteria. Interactive equipment 110 may measure these performance criteria periodically or at different time intervals and transmit the measured performance criteria in real time to a server IHS 200 for storage and analysis. A wired or wireless network 122 couples to activity stations 105-1, 105-2, 105-3, . . . 105-N to enable information to be transmitted between activity stations 105-1, 105-2, 105-3, . . . 105-N and server IHS 200. Network 122 may be a local area network (LAN), wide area network (WAN), or the Internet, or a combination of any of these networks. Activity stations 105-1, 105-2, 105-3, . . . 105-N may be in the same location or in different location remote with respect to one another. These activity stations may also be in locations remote from server IHS 200.

Server IHS 200 includes a server dynamic team selection tool 300 that receives and analyzes the measured performance criteria from the activity station 105-1 that user 1 employs. Dynamic team selection tool 300 stores the measured performance criteria and analysis results in a database 302. Dynamic team selection tool 300 may analyze the measured performance criteria received from user 1 as well as the measured performance criteria received from other users 2, 3, . . . N via their respective activity stations. Users 1, 2, . . . N represents the universe of prospective users from which tool 300 may select team members. Dynamic team selection tool 300 may select team members from the prospective team members, i.e. users 1, 2, . . . N to maximize, i.e. to optimize, aggregate or overall team performance. Alternatively, team selection tool 300 may select team members from the prospective team members in a manner that maximizes or optimizes the performance of a particular individual user.

While in one embodiment interactive equipment 110 may measure user performance criteria and send the measured performance criteria directly to dynamic team selection tool 300 in server IHS 200, in another embodiment activity station 105-1 may include a client IHS 400 with a client dynamic team selection tool 500 that gathers and stores measured performance criteria received from interactive equipment 110. In this embodiment, client dynamic team selection tool 500 sends the measured performance criteria to server dynamic team section tool 300 of server IHS 200 for storage and analysis. Client IHS 400 may include a display 240 for displaying locally measured performance criteria sent to display 240 by client dynamic team selection tool 500. Client IHS 400 may also display the results of performance analysis that client dynamic team selection tool 500 of client IHS 400 receives from server IHS 200. Display 115 of interactive equipment 110 may also display locally measured performance criteria and analysis results from server dynamic team selection tool 300 of server IHS 200.

Activity stations 105-2, 105-3, . . . 105-N are substantially identical to activity station 105-1. When comparing activity stations 105-1, 105-2, 105-3, . . . 105-N, like numbers indicate like elements. Each of activity stations 105-2, 105-3, . . . 105-N may transmit measured performance criteria of their respective users 2, 3, . . . N to server dynamic team selection tool 300 for storage and analysis to facilitate dynamic team selection.

Figure 2:
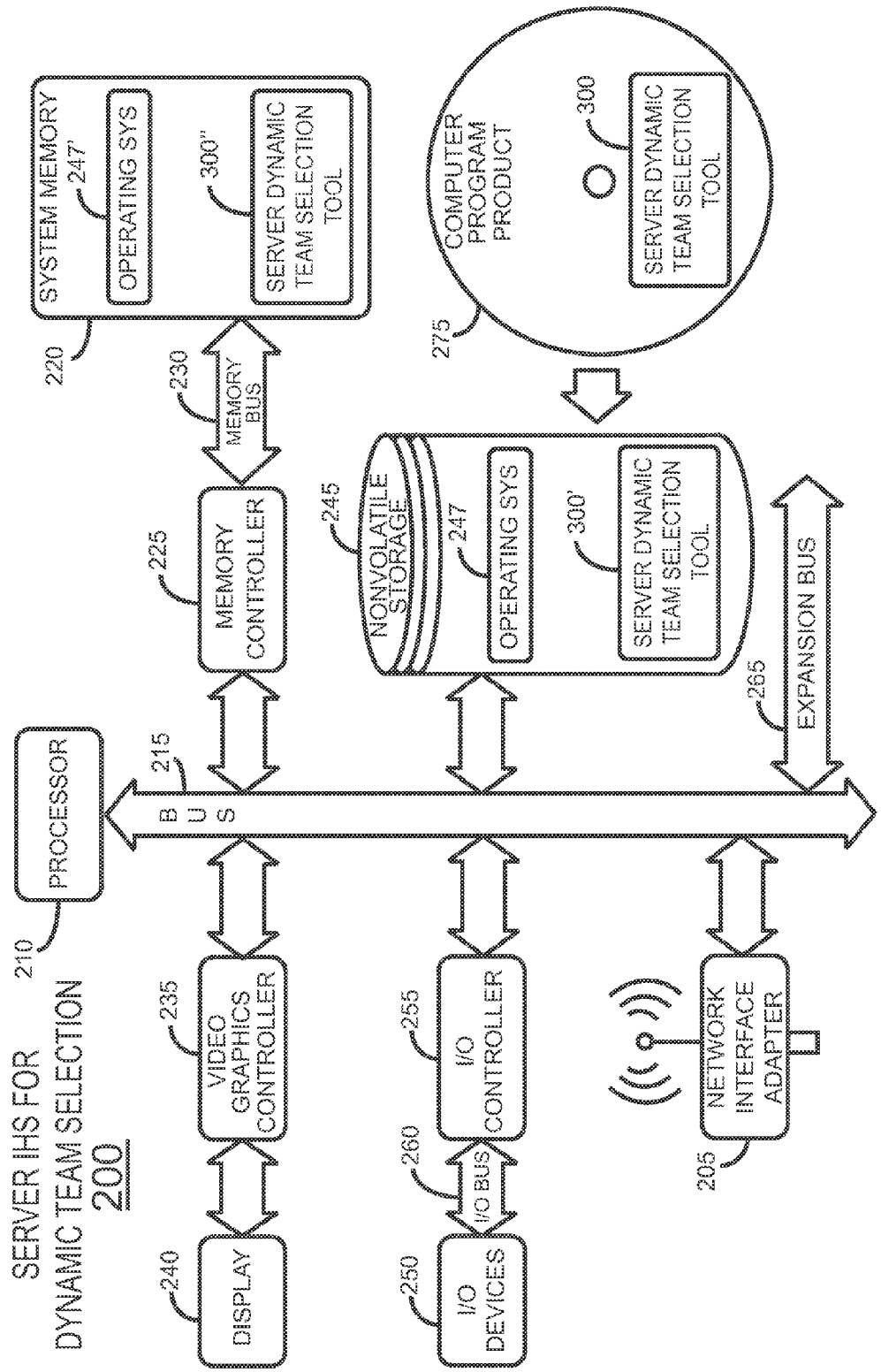
FIG. 2 is a block diagram of the disclosed server information handling system (IHS) including a server dynamic team selection tool.

FIG. 2 is a block diagram of a server IHS 200 for dynamic team selection that may be used as server IHS 200 of FIG. 1. Server IHS 200 includes a processor 210 that may include multiple cores. Server IHS 200 processes, transfers, communicates, modifies, stores or otherwise handles information in digital form, analog form or other form. Server IHS 200 includes a bus 215 that couples processor 210 to system memory 220 via a memory controller 225 and memory bus 230. In one embodiment, system memory 220 is external to processor 210. System memory 220 may be a static random access memory (SRAM) array or a dynamic random access memory (DRAM) array. Processor 210 may also include local memory (not shown) such as L1 and L2 caches (not shown). A video graphics controller 235 couples display 240 to bus 215. Nonvolatile storage 245, such as a hard disk drive, CD drive, DVD drive, or other nonvolatile storage couples to bus 215 to provide server HS 200 with permanent storage of information. Nonvolatile storage 245 stores an operating system 247 (OPERATING SYS) that governs operation of server IHS 200. I/O devices 250, such as a keyboard and a pointing device, couple to bus 215 via I/O controller 255 and I/O bus 260.

One or more expansion busses 265, such as USB, IEEE 1394 bus, ATA, SATA, PCI, PCIE, DVI, HDMI and other busses, couple to bus 215 to facilitate the connection of peripherals and devices to server IHS 200. A network interface adapter 205 couples to bus 215 to enable server IHS 200 to connect by wire or wirelessly to a network and other information handling systems. Network interface adapter 205 may also be called a network communication adapter or a network adapter. While FIG. 1 shows one representative IHS, the IHS may take many forms. For example, server IHS 200 may take the form of a desktop, floor-standing, rackmounted, portable, laptop, notebook, tablet, or other form factor computer or data processing system. IHS 200 may take other form factors such as a gaming device, a personal digital assistant (PDA), a portable telephone device, a communication device or other devices that include a processor and memory.

IHS 200 includes a server dynamic team selection tool 300 embodied as a computer program product 275 on digital media such as a CD, DVD or other media. In practice, IHS 200 may store operating system 247 (OPERATING SYS) and server dynamic team selection tool 300 on nonvolatile storage 245 as operating system 247 and tool 300'. When server IHS 200 initializes, the server IHS loads operating system 247 into system memory 220 for execution as operating system 247'. Server IHS 200 also loads server dynamic team selection tool 300' into system memory 220 for execution as dynamic team selection tool 300".

FIG. 3 is a flowchart that shows process flow of server dynamic team selection tool 300 when it executes on server IHS 200. Process flow commences when server IHS 200 initializes and launches server dynamic team selection tool 300, as per block 305. Server dynamic team selection tool 300 receives objective information, i.e. goal information, as per block 310. A team coordinator, coach, manager, supervisor or other qualified person may input this objective information into server 200 for use by tool 300. The objective information may include one or more main objectives as well as one or more intermediate objectives that users should perform before completing a main objective. The users 1, 2, 3, . . . N of activity stations 105-1, 105-2, 105-3, . . . 105-N are prospective team members, i.e. candidate team members, that tool 300 analyzes for possible inclusion on a particular team.

Server dynamic team selection tool 300 receives historical performance information for each prospective team member, as per block 315. Activity station 105-1 sends historical performance information of a prospective team member (user 1) to tool 300. Activity station 105-2 also sends historical performance information of a prospective team member (user 2) to tool 300. Activity station 105-N further sends historical performance information of prospective team member (user N) to tool 300. The historical performance information is performance information related to the same task or tasks that the user should perform in furtherance of the team objective or goal. In a scenario wherein the prospective team members are to participate in a competition such as a bicycle race, the historical performance information may include the prospective team member's best time, average time and worst time in previous similar races. Other historical performance information may include information such as elapsed time over a hilly terrain of predetermined distance, elapsed time over a flat terrain of predetermined distance, best off-track time over a predetermined distance, and best on-track time over a predetermined distance.

Server dynamic team selection tool 300 also receives user preference information from each team member's activity station, as per block 320. This preference information may include the prospective team member's preference to be a leader or follower, the prospective team member's age group preference, the prospective team member's jersey color preference, as well as other preferences relevant to the activity in which the prospective team member desires to participate. Other preference information may include information such as preference to be on a large team, preference to be on a small team, preference to be on a female team, preference to be on a male team, preference to be on a mixed male/female team, preference to be on a highly ranked team, and preference to be on a moderately ranked team. Although a user may self-identify as being a leader or follower via their preference information, server dynamic team selection tool 300 may independently categorize a particular user as being a leader or follower by analyzing that user's historical performance information for traits of leadership and/or group contributor traits. In this manner, tool 300 may classify each user as a leader or follower for a particular team activity, as per block 325.

Server dynamic team selection tool 300 performs an initial rating of each prospective team member based on the historical performance information of each team member, as per block 330. Prospective team members that exhibit greater historical performance toward achievement of the objective or goal may receive higher rating numbers than those with lesser historical performance and skills. In one embodiment, server dynamic team selection tool 300 analyzes the historical performance information for each prospective team member. From this historical performance information, tool 300 forms a team by selecting those prospective team member who would maximize aggregate team performance, as per block 335. Tool 300 may maximize aggregate or overall team performance by evaluating a prospective team member's individual goals by considering that prospective team member's historical performance information as a factor. Historical performance information may include information with respect to the particular role of the prospective team member on a previous team when that previous team reached its goals. Historical performance information may also include information with respect to the makeup or composition of that previous team. The makeup or composition of a team may include team size, individual leadership role (leader, follower) and team dynamics such as inter-member dynamics (male, female, mixed). Tool 300 may also maximize aggregate or overall team performance by evaluating a prospective team member's individual goals by considering that prospective team member's user preference information as another factor. It is possible that the user preferences of a prospective team member may conflict with the historical performance information for that prospective team member. Tool 300 may allow an operator of the system to weight these criteria, namely the historical performance information and the user preferences, as part of selecting members for a team.

Tool 300 may consider inter-member dynamics from a previous team as a factor in the team selection. Such dynamics of a prospective team member include those member to member dynamics that a particular prospective member exhibited when participating on a previous team. Relevant inter-member dynamics of a particular prospective team member include those dynamics that improved or reduced that prospective team member's performance in the past on the previous team. Inter-member dynamics include how well one member with predetermined characteristics works with another member with predetermined characteristics. These predetermined characteristics may be the same for each member, different for each member, or there may be an overlap of predetermined characteristics of the two members. Tool 300 may determine ideal team makeup by considering factors such as team size requirements, the individual leadership role (leader/follower) as well as inter-team dynamics. To maximize the performance of a particular team, tool 300 may also search among prospective team members to locate a team member who can fill a role that is currently missing on a particular team. In a scenario wherein multiple prospective team members each indicate in their user preferences the characteristics or criteria of their ideal target team, tool 300 may use a "best fit" algorithm to accommodate as many prospective team members' preferences as possible. In one embodiment, tool 300 may allow each team to pick the members that the team itself wants. In this case, tool 300 still determines those prospective members selected for multiple teams, but uses each team's member selection requests as a factor in the selection process. Tool 300 may throw these prospective team members selected by multiple teams back into a member pool and multiple teams may vie with another to select these prospective team members. For example, these multiple teams may employ a round-robin selection to select from these prospective team members. Tool 300 may provide preferential selection rights to a particular team among these multiple teams.

In another embodiment, tool 300 forms a team by selecting those prospective team members in a manner that increases and/or maximizes the performance of a particular individual team member, as per block 335'. In this alternative embodiment, block 335' is substituted for block 335. In this alternative embodiment, tool 300 may evaluate an individual team member in the manner described above, namely by considering as factors the past performance information, user preferences, and inter-member dynamics of the prospective team member's former teams. Tool 300 may also determine ideal team makeup in the manner described above. However, in this alternative embodiment, tool 300 goes beyond these factors and also considers the amount by which a particular prospective team member wants to improve their individual performance, this amount being designated as the desired performance increase or delta. The desired performance increase or delta is defined as the amount by which a particular prospective team member desires to increase his or her performance between a current level of performance and a higher level of performance. The desired performance increase may be expressed as a percentage increase in performance level with respect to the current level of performance. Tool 300 may receive desired performance increase information from the individual prospective team member or a system operator, depending on the particular application. For discussion purposes, "member A" is a prospective team member with specific goals. In response to receiving specific goal information from member A or a system operator, tool 300 may identify other prospective team members (such as member B) who have goals that are complementary to the goals of member A. In this scenario, member B may not have as many goals as member A and may obtain satisfaction from helping others. This may result in each helping the other and maximizing the individual performance of prospective team member A. In this embodiment, tool 300 may compare the user preferences of member A with other prospective team members and select a team for member A wherein the user preferences of member B match the user preferences of member A, and historical performance information indicates that member A benefited from working with a person having characteristics similar to member B in the past.

After selecting team members to form a particular team in accordance with either block 335 or block 335', the selected team members of the particular team begin interactive activity on their respective activity stations 105-1, 105-2, 105-3 . . . 105-N, as per block 340. For example, if the activity is a bicycle race, the selected team members of the particular team begin pedaling at their respective activity stations. In this case, interactive equipment 110 is a cycling type device that the user may pedal. The selected team members of the particular team may observe their progress with respect to other members of their particular team on display 115 and/or display 240. In one embodiment, these displays may show a representation of each selected team member of the particular team on a race course, so that each selected team member may see their position relative to other team members of the particular team in real time. In one embodiment, the team members may also see the performance of other teams on the display or displays. Tool 300 may also generate simulated teams with whom the team members of the particular team may compete. In that embodiment, activity stations 105-1, 105-2, . . . 105-N receive and display simulated team information from tool 300 of server IHS 200. In that case, the display of an activity station may display not only the individual members of the selected team but also the members of one or more simulated teams. During or after the intra-team competition and/or inter-team competition, tool 300 rates the performances of the respective selected team members toward the team objective or, as per block 340.

After rating the performances of the team members of the particular team, tool 300 provides feedback to the team members of the particular team, as per block 345. This feedback may take the form of showing each team member's total activity time from beginning to the end of the competition, or other feedback that indicates the relative position of a particular team member and/or the team with respect to other competitors and/or teams. At this point, the disclosed methodology may end as per block 350 or, alternatively, process flow may continue back to block 315 and flow continues. In that case wherein the process continues, tool 300 may revise the team selection based on historical performance information that now includes the performance information that the now completed competition provides. In this manner, tool 300 forms a revised team. Team members may be intelligently and objectively added or removed by tool 300 upon analysis of the revised historical performance information that now includes the most recent performance information gathered from the most recent actual competition.

The historical performance information of the team members of the particular team now includes the ratings of the selected team members from block 340 of the most recent competition. Tool 300 may continue to adjust the membership of the particular team after each competition to form a team that improves, maximizes or optimizes the overall or aggregate team performance, as per block 335. Alternatively, tool 300 may adjust the membership of the particular team after each completion to form a team that improves, maximizes or optimizes the performance of a particular individual team member, as per block 335'. To alter the membership of the team, tool 300 may consider the historical performance information of new prospective team members not previously analyzed by tool 300.

FIG. 4 is a block diagram of a client IHS 400 for dynamic team selection that may be used as client IHS 400 of FIG. 1. Client IHS 400 is similar to server IHS 200 of FIG. 2 except for client selection tool 500. As per FIG. 4, IHS 400 is configured as a client IHS rather than a server IHS. Like numbers indicate like elements when comparing client IHS 400 of FIG. 4 with server IHS 200 of FIG. 2. In one embodiment, client dynamic team selection tool 500 cooperates with server dynamic team selection tool 300 of server IHS 200 to practice the disclosed team selection methodology, as described below in more detail with reference to the flowchart of FIG. 5.

FIG. 5 is a flowchart that shows process flow of client dynamic team selection tool 500 when it executes on client IHS 400 in cooperation with server team selection tool 300 that executes on server IHS 200. The flowchart of FIG. 5 for client IHS 400 bears some similarities to the flowchart of FIG. 3 for server IHS 200 because the flowchart of FIG. 5 shows the client side of the disclosed methodology, whereas the flowchart of FIG. 3 shows the server side of the disclosed methodology. For discussion purposes, the following describes the process flow in a representative client team selection tool 500 in activity station 105-1. It should be understood however that activity stations 105-2, 105-3, . . . N may implement the same or similar process flow.

Process flow commences when client IHS 400 initializes and launches client dynamic team selection tool 500, as per block 505. Client team selection tool 500 sends historical performance information for the user of an activity station such as 105-1 via network 122 to server dynamic team selection tool 300 of server IHS 200, as per block 515. For example, a user such as prospective team member 1 or other information source provides historical performance information with respect to perspective team member 1 to client dynamic team selection tool 500 of activity station 105-1. Activity station 105-1 transmits this historical performance information to server IHS 200 on behalf of prospective team member 1.

Client dynamic team selection tool 500 of activity station 105-1 sends preference information of prospective team member 1 to server IHS 200, as per block 520. Server dynamic team selection tool 300 receives historical performance information from the activity stations of prospective team members 1, 2, 3 . . . N. In response to receiving that historical performance information, server dynamic team selection tool 300 analyzes the historical performance information and determines projected initial ratings of performance of the prospective team members. Server dynamic team selection tool 500 transmits the initial ratings of the prospective team members to activity stations 105-1, 105-2, 105-3, . . . N. By way of example, activity station 105-1 receives and displays the initial rating of the prospective team members on display 110 and/or display 240, as per block 530.

Server dynamic team selection tool 300 selects team members by using the initial rating information for the prospective team members. In one embodiment, tool 300 uses the historical performance information and ratings to select team members to increase, maximize and/or optimize overall team performance. In that embodiment, tool 300 identifies the team members accordingly selected using these criteria and transmits a notification of the selected team members to the activity stations 105-1, 105-2, 105-3, . . . N. By way of example, activity station 105-1 receives and displays those team members that were selected to maximize overall team performance, as per block 535. In an alternative embodiment, tool 300 uses the historical performance information and ratings to select team members to increase, maximize and/or optimize the performance of a particular individual team member, or particular individual team members. In that embodiment, tool 300 identifies the team members accordingly selected using these criteria and transmits a notification of the selected team members to the activity stations 105-1, 105-2, 105-3, . . . N. By way of example, activity station 105-1 receives and displays this team selection that was chosen to maximize a particular individual team member's performance, as per block 535'.

After team selection by server dynamic team selection tool 300 in the manner described above, the selected team member at each activity station commences activity by engaging interactive equipment 110, as per block 540. The client dynamic team selection tool 500 at each activity station collects and transmits real time performance information of its respective selected team member to server dynamic team selection tool 300, as per block 540. For each selected team member, that team member's activity station stores the team member's current real-time performance information as part of the historical performance information for that selected team member, as per block 545. Interactive equipment 110 and/or tool 500 may store this historical performance information in the activity station. Server dynamic team selection tool 300 analyzes this updated historical performance information of each selected team member to revise team member selections, as per block 550. In that case, process flow continues back to block 515 and the selected team is re-evaluated. This may result in the formation of a new team with different members as the selected team members are re-rated during or after each competition. Alternatively, the process may end at block 550.

FIG. 6A depicts a dynamic competition system 600 that is useful for training members of a group in a manner whereby group members experience dynamically changed competition levels as they progress toward a goal in a group activity. In one embodiment, the competition level experienced by one or more members may vary in response to detecting that a particular member reached an intermediate goal on the way to an end goal.

Dynamic competition system 600 of FIG. 6A exhibits a topology similar to that of team selection system 100 of FIG. 1. Like numbers indicate like elements when comparing dynamic competition system 600 of FIG. 6A with team selection system 100 of FIG. 1. Server IHS 700 of FIG. 6A includes a server dynamic competition tool 800 that dynamically varies the competition level experienced by one or more group members as they progress toward the end goal. Dynamically varying the competition level that a particular member experiences may include varying the difficulty level that a particular member experiences compared with other group members on the way to achieving the end goal. By way of example with respect to activity station 105-1 of FIG. 6A, server dynamic competition tool 800 of server IHS 700 communicates and cooperates with client dynamic competition tool 1000 of client IHS 900 of each activity station 105-1, 105-2, 105-3, . . . 105-N.

Dynamic competition system 600 includes activity stations 105-1, 105-2, 105-3, . . . 105-N, wherein N is the total number of activity stations within the system. Users 1, 2, 3, . . . N, represent the respective users of activity stations 105-1, 105-2, 105-3, . . . 105-N. Users 1, 2, 3, . . . N may alternatively be referred to as members 1, 2, 3, . . . N. With respect to dynamic competition system 600, the terms users and members may be used interchangeably. Activity station 105-1 is representative of the activity stations in system 100 and will thus be described in detail.

Figure 6B:
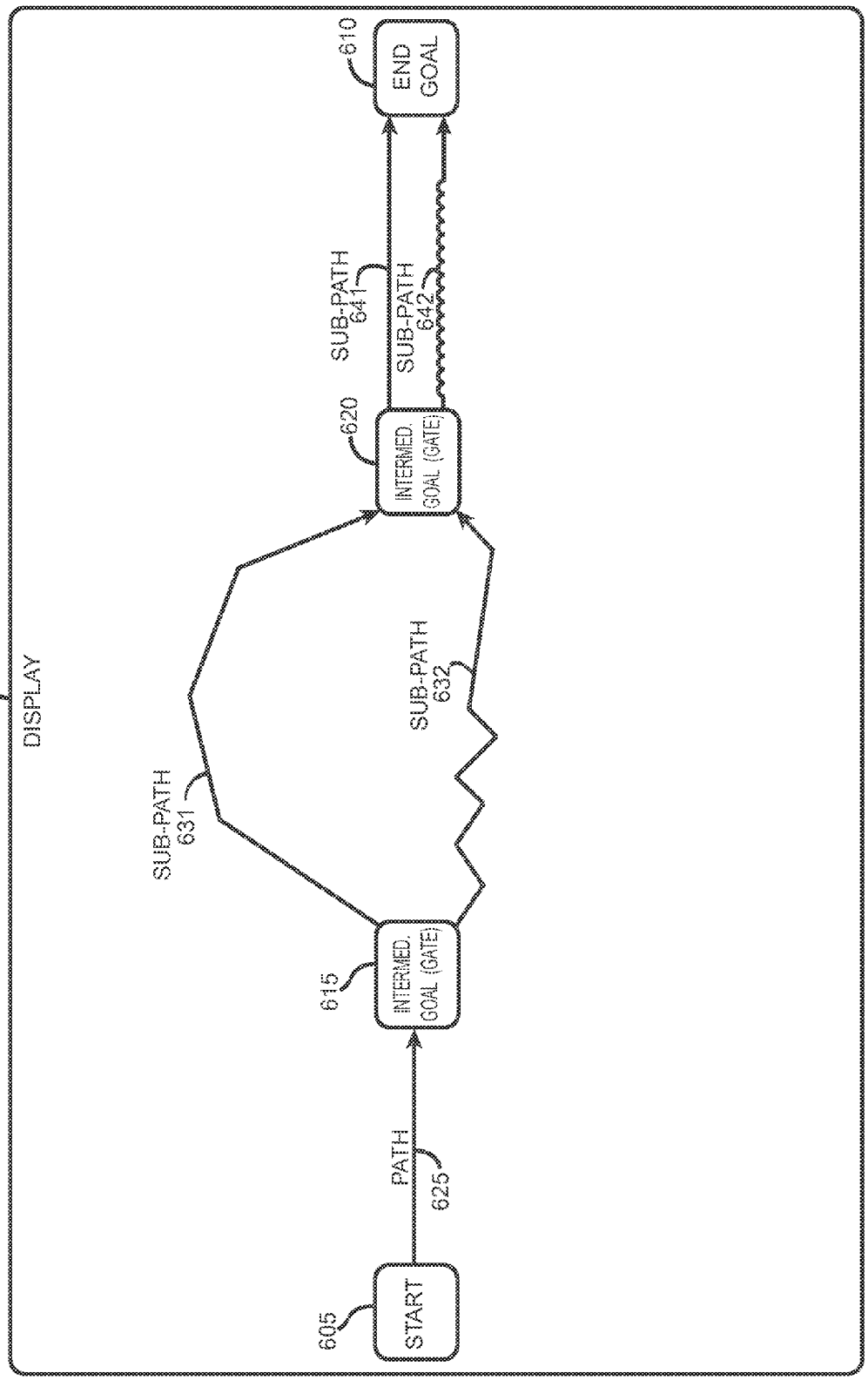
FIG. 6B is a display for viewing by users of the system of FIG. 6A.

FIG. 6B shows a representative image of a display 115, 240 that activity station 105-1 may display to user 1. In one embodiment, server dynamic competition tool 800 sends a graphical representation of a course on which users may compete from a start point 605 to an end point, i.e. end goal 610. Start point 605 may represent a physical location at which users begin their quest to achieve the end goal 610. Multiple intermediate goals such as intermediate goals 615 and 620 may be present between start 605 and goal 610.

At the beginning of the competition between users 1, 2, 3, . . . N, all users commence activity at start 605. The activity may be a physical activity in which the user interacts with interactive equipment 110. For example, as discussed above interactive equipment 110 may be a bicycle exercise device, an ergometer, a rowing machine, a treadmill or other interactive equipment with which the user may physically interact. In another embodiment, the activity may be another activity in which the user interfaces with interactive equipment 110, such as working on a software or hardware design project. However, for discussion purposes, interactive equipment 110 is described as a bicycle exercise device with which a respective user interacts from start 605 to end goal 610, as seen on display 115, 240 of FIG. 6B.

As seen in FIG. 6B, the course that display 240 depicts may include one or more intermediate goals such as intermediate goals 615 and 620. In this particular example, server dynamic competition tool 800 instructs display 240 to display a course with a path 625 between start 605 and intermediate goal 615. In this particular embodiment, intermediate goal 615 includes a gate (not separately shown) that opens to sub-path 631 or sub-path 632. Display 240 may display a representation of this gate for the user to see. Server dynamic competition tool may enforce a rule that the first user to reach intermediate goal 615 may select either sub-path 631 or sub-path 632. If that user selects sub-path 631, then in accordance with the rule, users who subsequently arrive at intermediate goal 615 may not select sub-path 631. The gate to sub-path 631 closes. In other words, server dynamic competition tool 800 gates off sub-path 631 to users that subsequently arrive at intermediate goal 615. Rather, those subsequently arriving users are forced to take the remaining sub-path 632. However, if the first user to arrive at intermediate goal 615 selects and takes sub-path 632, then tool 800 gates off subsequently arriving users from taking sub-path 632. Tool 800 forces those subsequently arriving users to take the remaining un-gated sub-path, namely sub-path 631. Server dynamic competition tool 800 senses that a particular user arrived first at intermediate goal 615 first by monitoring user position information that tool 800 receives from client dynamic competition tool 1000 of each activity station 105.

The compositions of sub-path 631 and sub-path 632 are such that users on one sub-path may experience a different level of competition or difficulty than users on the other sub-path. According to a particular user's skills, it may be desirable for a particular user to take one path or the other. In other words, one sub-path may be advantageous in comparison with the other sub-path for a particular user. For example, sub-path 631 may exhibit a longer distance and exhibit a less hilly terrain than sub-path 632. However, sub-path 632 may be shorter but exhibit a more hilly terrain than sub-path 631. The first user to reach intermediate goal 615 and its gate may select the sub-path that best matches that user's skills and historical performance traits. When that user exits intermediate goal 615 and commences travel on a selected sub-path, the user's competition level and/or level of difficulty experienced changes. The competition or difficulty change occurs in response to tool 800 determining that the particular user was the first to arrive at intermediate goal 615.

The competition continues after this dynamic alteration of the competition level at intermediate goal 615. In this example, tool 800 instructs display 240 to display a course wherein sub-paths 641 and 642 extend from intermediate goal 620 at its gate to end goal 610. Sub-paths 641 and 642 exhibit the same distance; however, sub-path 641 exhibits a smooth pavement, whereas sub-path 642 exhibits a bumpy pavement surface. For purposes of discussion, assume that the particular user who arrived first at intermediate goal 615 and who selected the longer but smoother sub-path 631 benefits from this selection and reaches intermediate goal 620 first before other users. Server dynamic competition tool 800 senses that the particular user arrived at intermediate goal 620 first before other users by monitoring user position information that tool 800 receives from client dynamic competition tool 1000 of each activity station. Since the particular user, for example user 1 arrived first at intermediate goal 620, that user may select and take either sub-path 641 or sub-path 642 for the remainder of the competition to reach end goal 610.

In this example, user 1 elects to take sub-path 641 instead of sub-path 642. The competition level and order of difficulty that user 1 experiences upon selecting and taking sub-path 641 changes from that experienced before reaching intermediate goal 620 and its gate. When the remaining users reach intermediate goal 620, they observe that the gate to smooth sub-path 641 is closed and they must take the bumpy, more difficult sub-path 642. Thus, upon exiting intermediate goal 620 and its gate, these remaining users on bumpy sub-path 642 experience effectively increased competition from user 1 on smooth sub-path 641. Likewise, these remaining users experience more difficulty on bumpy sub-path 642 in reaching end goal than user 1 experiences on smooth sub-path 641. In this scenario, tool 800 instructs display 240 to display user 1 as reaching end goal 610 first.

FIG. 6C shows display 240 including a compilation of images showing the relative positions of users 1, 2, 3 and 4 while they compete with one another from start 605 to end goal 610. More particularly, FIG. 6C depicts the relative positions of these users effectively taken as snapshots in time at times T1, T2, T3, T4 and T5. Tool 800 receives user performance information from tools 1000 of activity stations 105-1, 105-2, 105-3 and 105-4 (not shown) of respective users 1, 2, 3 and 4 (not shown). Tool 800 processes the performance information of users 1, 2, 3 and 4 to determine the relative positions of users 1, 2, 3 and 4 as they progress over the course that display 240 depicts. The performance information that tool 800 receives may include the work output that users exert on the interactive equipment 110. Tool 800 commands tool 1000 to instruct interactive equipment to exert an appropriate amount of resistance to work by the user in accordance with the course conditions at the location where the user is currently peddling. If tool 800 determines that the user is located at a course position with a smooth level surface, then tool 800 instructs interactive equipment 110 to exhibit low resistance to the peddling effort and work of the user. However, if tool 800 determines that the user is located at a course position with a steep incline, then tool 800 instructs interactive equipment 110 to exhibit an increased amount of resistance to the peddling effort of the user. If tool 800 determines that the user is located at a track position with a bumpy surface, then tool 800 may instruct interactive equipment to 110 provide appropriate motion feedback and increased peddling difficulty to correspond to these track conditions. Tool 800 also commands tool 1000 to display each user's current relative position on the course on the user's respective display 240.

At time T1 in FIG. 6C, display 240 shows users 1, 2, 3 and 4 in user grouping 651 as indicated by dashed lines. The users begin the competition at start point 605 at time T1. Grouping 651 shows the position of the users as a snapshot in time taken at time T1. Tool 800 receives performance information from the respective activity stations 105 as the users engage interactive equipment 110 at their activity stations and progress toward intermediate goal 615 along common path 625. Tool 800 commands tool 1000 to instruct display 240 to display the relative positions of the users on the course as they progress from start point 605 to end goal 610.

In this particular example, after analyzing the work output of the individual users as they progress along common path 625, tool 800 commands tool 1000 to instruct display 240 to show the relative positions of users 1, 2, 3 and 4 at time T2. At time T2, grouping 652 indicates that user 4 arrived at intermediate goal 615 before the other users. Tool 800 receives the choice of user 4 to take sub-path 631. In response, tool 800 instructs tool 1000 to gate off sub-path 631 to other users. Thus, when the other users arrive at intermediate goal 615, they see on their respective displays 240 that the gate to sub-path 631 is closed. For this reason, tool 800 forces the other users to take sub-path 632 by so instructing tool 1000 and display 240.

At time T3, grouping 653 indicates the relative progress of user 4 on sub-path 631 and the other users on sub-path 632. At time T4, grouping 654 indicates that user 4 on sub-path 631 arrived first at intermediate goal 620 before the other users. Tool 800 receives the choice of user 4 to take smooth sub-path 641. In response, tool 800 instructs tool 1000 to gate off sub-path 642 to the other users. For this reason, when the other users arrive at intermediate goal 615, they see on their respective displays 240 that the gate to sub-path 641 is closed. Tool 800 forces the other users to take sub-path 642 by so instructing tool 1000 and display 240. While sub-path 641 and 642 exhibit the same length, sub-path 642 is bumpy. Thus, sub-path 642 exhibits more difficulty and slows users down in comparison with smooth sub-path 641. The slow conditions of sub-path 642 effectively increase the competition experienced by the users travelling sub-path 642 as compared with sub-path 641. Conversely, user 4 travelling on smooth sub-path 641 effectively experiences less difficulty and less competition when compared with the other users travelling on sub-path 642. At time T5, grouping 655 indicates that user 4 arrives first at end goal 610 ahead of users 1, 2 and 3. The competition level experienced by the users as they travel over the course that display 240 depicts thus varies dynamically in response to actions by users during the competition, such as the action of reaching an intermediate goal before other users, for example. In one embodiment, tool 800 commands a particular activity station to vary the competition level or difficulty level of that activity station in response to, and/or as a function of, the amount of progress made by the user of that particular activity station toward the end goal. Reaching an intermediate goal before other users is one measure of progress by a user toward the end goal.

FIG. 7 is a block diagram of a server IHS 700 that is configured to provide dynamically changing competition levels to one or more group members and that dynamic competition system 600 may employ as server IHS 700 of FIG. 6A. Server IHS 700 of FIG. 7 is similar to server IHS 200 of FIG. 2 except for server dynamic competition tool 800. As per FIG. 7, IHS 700 is configured as a server IHS that may be coupled to activity stations by a network. Like numbers indicate like elements when comparing server IHS 700 of FIG. 7 with server IHS 200 of FIG. 2. In one embodiment, server dynamic competition tool 800 of server IHS 700 cooperates with client dynamic competition tool 1000 of client IHS 900 to practice the disclosed dynamic competition methodology, as described below in more detail with reference to the flowchart of FIG. 8.

FIG. 8 is a flowchart that shows process flow of server dynamic competition tool 800 when it executes on server IHS 700 in cooperation with client dynamic competition tool 1000 that executes on client IHS 900. Process flow commences when server IHS 200 initializes and launches server dynamic competition tool 800, as per block 805. Server dynamic competition tool 800 receives start information, as per block 810. The start information may include information describing the beginning location or start point of the users of activity stations on a course on which they will compete. The course may take the form of a cycling race course in one embodiment. In another embodiment, the course may be a map of intermediate goals or objectives and an end goal or objective in a product design scenario or other activity in which the users competitively participate. For discussion purposes, the flowchart of FIG. 7 is discussed with reference to a cycling course over which multiple competing users travel from a start point to reach an end goal. Dynamic competition tool 800 receives end goal information describing the location of end goal 610 on the course, as per block 815. A group coordinator, coach, manager, supervisor or other qualified person may input start information and end goal information into server IHS 700 for use by tool 800 in implementing the disclosed dynamically changing competition methodology.

Dynamic competition tool 800 receives course layout information, as per block 820. The course layout information may include multiple paths and sub-paths that a user may take between the starting point 605 and end goal 610. The course layout information that dynamic competition tool 800 receives may include intermediate goal information that describes one or more intermediate goals such as intermediate goals 615 and 620 that a user may encounter before reaching end goal 610. In one embodiment, the course layout information that dynamic competition tool 800 receives includes start point information, end goal information, intermediate goal information as well as paths and sub-paths between the starting point, intermediate goals and end goals that together form the course on which the users compete.

To commence the competition among the users at the starting point 605, server dynamic competition tool 800 sends activity stations 105-1, 105-2, 105-3 and 105-N a start signal, as per block 825. In response to the start signal, client dynamic competition tools 1000 of the activity stations instruct that users at respective activity stations to begin competitive interactive activity such as beginning activity on interactive equipment 110. In this embodiment, the interactive activity is a cycling activity on interactive equipment 110, which may be a cycling machine, ergometer or cycling simulator. When the users interact with the interactive equipment 110 such as by a peddling action that expends energy, interactive equipment 110 senses, collects and stores user performance information. The information thus gathered is designated as sensed performance information in that it is performance information sensed at the activity station. In one embodiment, the sensed performance information is raw performance information not yet processed by comparison with the performance information of other activity stations by tool 800. Each client dynamic competition tool 1000 receives sensed performance information from the respective interactive equipment 110 coupled thereto and sends the sensed performance information of the activity station to tool 800 of server IHS 700 for analysis.

Server dynamic competition tool 800 of server IHS 700 receives the sensed performance information from each of the activity stations 105-1, 105-2, 105-3 and 105-N, as per block 830. The performance information may include distance travelled from the start point, real time speed, work expended by the user per unit time, as well as other performance information. Tool 800 analyzes the sensed performance information received from the activity station of each user, as per block 835. In response to completion of each real time analysis of the sensed performance information received from the activity stations of the users, tool 800 sends analyzed performance information, i.e. analysis results, to the activity stations for display. The analyzed performance information may include the relative position of each of the users with respect to one another and their respective speeds, distances traveled and other analyzed performance information useful to display on the displays 240 of the activity stations. The client competition tools 1000 of the activity stations instruct their respective displays 240 to display the analyzed performance information. In this manner, each user may observe his or her current location relative to the other users who all work to achieve end goal 610. For rendering on display 240, the analyzed performance information may also optionally include speed of one or more user, or the speeds of all users. The analyzed performance information may also optionally include the work output of one or more users, or the work output of all users. The display 240 displays the real time performance of users with respect to one another, as per block 840. The display 240 may render images such as shown in the snapshots at times T1, T2, T3, T4 and T5 of FIG. 6C.

From the analyzed performance information that tool 800 generates, tool 800 determines the particular user to reach an intermediate goal 615, as per block 845. Tool 800 instructs that particular user's display 240 to indicate a sub-path choice, namely either sub-path 631 or sub-path 632 in this example. The particular user selects one of these sub-paths and indicates his or her choice to tool 1000 of that user's activity station. Tool 800 of server IHS 700 receives this sub-path choice, as per block 850. This choice of sub-path represents a choice between two different tasks, i.e. traversing a long but smooth sub-path 631 or traversing a shorter but hillier sub-path 632. In response to the particular user selecting a sub-path, tool 800 commands tools 1000 to instruct displays 240 that users must take the remaining sub-path that the particular user did not select. As per block 855, tool 800 instructs tool 1000 to activate a gate representation at the displayed intermediate goal 615 to provide a notification to users that the sub-path selected by the particular user is closed. The closed gate to sub-path 631 indicates to the other users that they must take a remaining un-selected sub-path 632. The competitive level experienced by the users forced to take unselected sub-path 632 dynamically changes in comparison with the user on the selected sub-path 631, and vice versa.

Tool 800 performs a test to determine if the course includes any more intermediate goals after the first intermediate goal 615, as per decision block 860. In this particular example, tool 800 determines from the information it received with respect to course configuration that there is another remaining intermediate goal 620. In response to determining that there is another remaining intermediate goal, process flow continues back to block 830 at which tool 800 receives more real time performance information from the activity stations. Tool 800 then determines the particular user to reach the next intermediate goal, namely intermediate goal 620. Again the particular user selects a desired sub-path from multiple sub-paths and the competition continues. The competition level and/or difficulty experienced by the particular user again changes at this point. As the competition continues forward, ultimately there will be no more intermediate goals and the next goal will be the end goal 610. When this occurs, process flow continues from decision block 860 to block 865 at which tool 800 determines the first user to reach end goal 810. In response to a particular user reaching end goal 610 first or in response to the last user reaching end goal 610, tool 800 sends final analyzed performance information to the activity stations for display on displays 240, as per block 870. The final analyzed performance information may include notification of first, second and third place finishers, individual metrics of peak speed, minimum speed, average speed, distance covered and relative positions at selected points in the competition. The process ends at end block 875.

Figure 9:
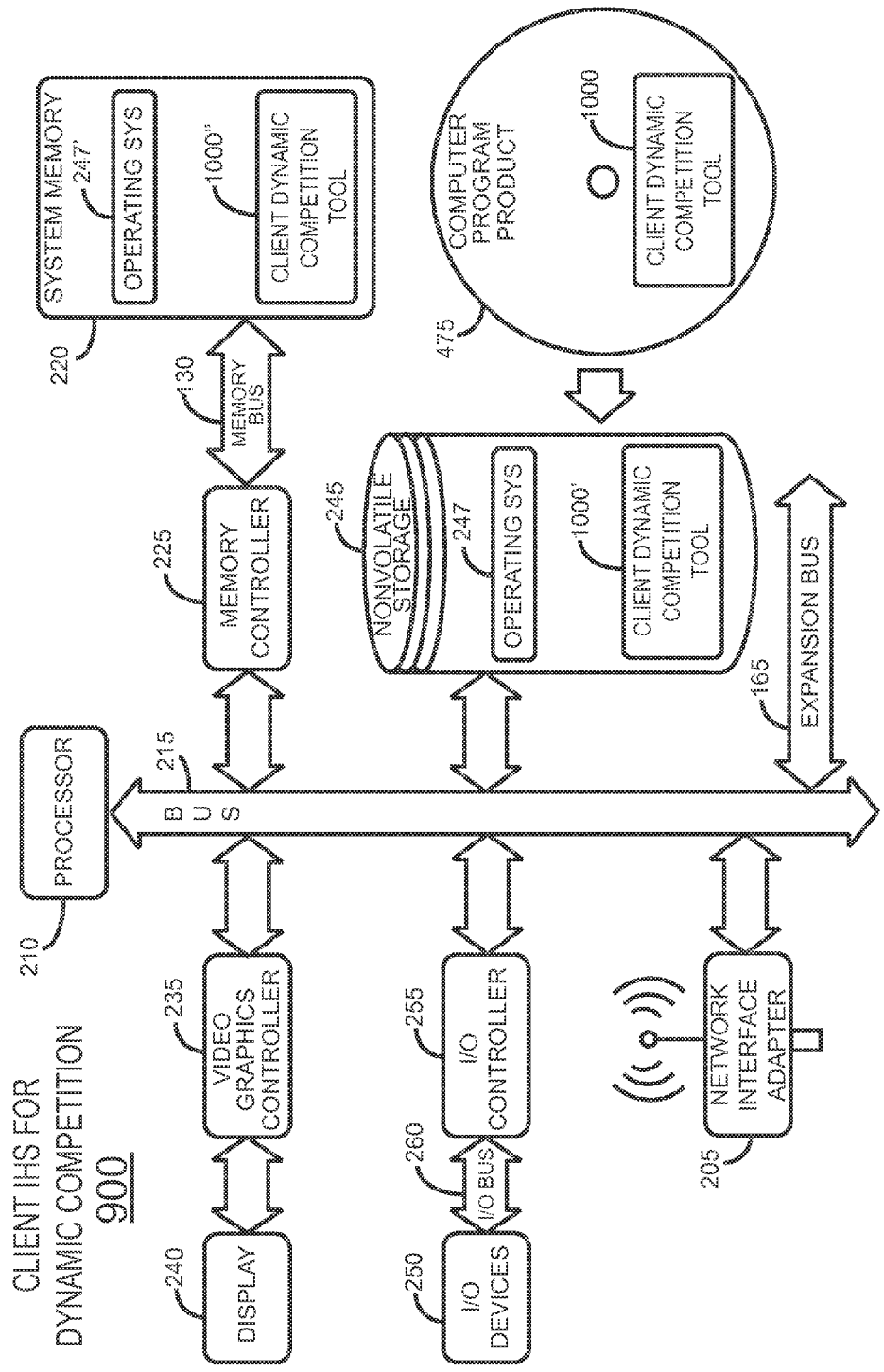
FIG. 9 is a block diagram of the disclosed client IHS including a client dynamic team competition tool.

FIG. 9 is a block diagram of a client IHS 900 with dynamic competition tool 1000 that together may be used as client IHS 900 of FIG. 6A. Client IHS 900 is similar to server IHS 700 of FIG. 7 except for client dynamic competition tool 1000. As per FIG. 9, IHS 900 is configured as a client IHS rather than a server IHS. Like numbers indicate like elements when comparing client IHS 900 of FIG. 9 with server IHS 700 of FIG. 7. In one embodiment, client dynamic competition tool 1000 cooperates with server dynamic competition tool 800 of server IHS 700 to practice the disclosed dynamic competition methodology, as described below in more detail with reference to the flowchart of FIG. 10.

Figure 10:
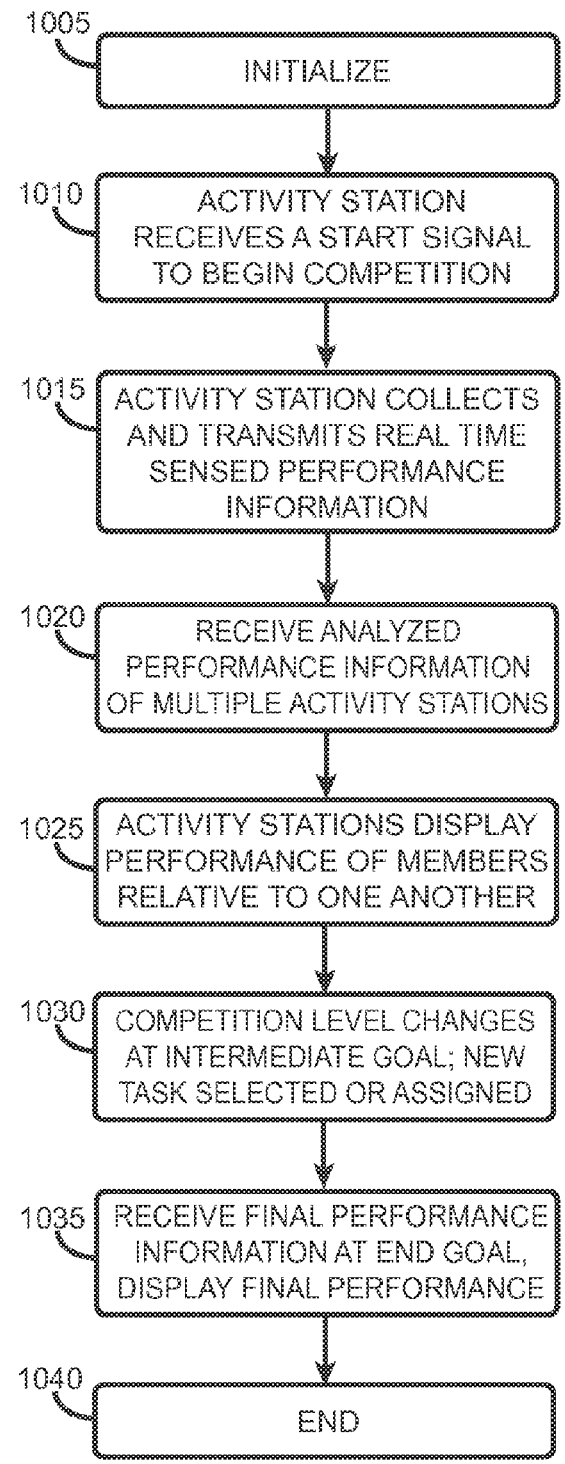
FIG. 10 is a flowchart of process flow in the disclosed client dynamic competition tool.

FIG. 10 is a flowchart that shows process flow of client dynamic competition tool 1000 when it executes on client IHS 900 in cooperation with server team selection tool 800 that executes on server IHS 700 of FIG. 6A. The flowchart of FIG. 10 for client IHS 900 bears some similarities to the flowchart of FIG. 8 for server IHS 700 because the flowchart of FIG. 10 shows the client side of the disclosed methodology, whereas the flowchart of FIG. 8 shows the server side of the disclosed methodology. For discussion purposes, the following describes the process flow in a representative client dynamic competition tool 1000 in activity station 105-1. It should be understood however that activity stations 105-2, 105-3, . . . N may implement the same or similar process flow.

Process flow commences when client IHS 900 initializes and launches client dynamic team selection tool 1000, as per block 1005. Activity station 105-1 receives a start competition signal, as per block 1010. Activity station 105-1 displays a message or provides an indicator on display 240 to notify the user to begin the competition. At the same time, other activity stations receive respective start competition signals to instruct the users of those activity stations to begin the competition as well. Users begin the competition by interacting with the interactive equipment 110 of their respective activity stations 105. For example, the users may begin peddling, rowing or otherwise interacting with interactive equipment 110 depending on the nature of the particular competitive endeavor associated with system 600. The client dynamic competition tool 1000 of each activity station collects and stores real time performance information with respect to the user of that activity station. Tool 1000 of each activity station 105 transmits sensed real time performance information to tool 800 in server IHS 700, as per block 1015.

Tool 800 of server IHS 700 receives the sensed real-time performance information from each activity station and analyzes the sensed real-time performance information as discussed above. Tool 800 of the server IHS 700 sends the analyzed performance information to tool 1000 of client IHS 900 of each of the multiple activity stations 105. Tool 1000 of the activity stations receives the analyzed performance information from tool 800 of the server IHS 700, as per block 1020. The display 240 of each activity station 105 displays the performances of the users in the competition relative to one another throughout the course, as per block 1025. For example, the display 240 of each activity station 105 may display the relative positions of the users as shown in FIG. 6C at snapshots in time T1, T2, T3, T4 and T5. When a particular user reaches an intermediate goal and selects a sub-path beyond that goal, the competition and/or difficulty level experienced by that particular user changes with respect to that of the other users, as per block 1030. When the particular user selects one of these sub-paths exiting an intermediate goal, the user is effectively selecting one of multiple tasks. As discussed above, when the particular user selects a sub-path, tool 1000 instructs display 240 of client IHS 900 to indicate that the selected sub-path is gated off. In other words, other users who reach the intermediate goal are presented with a graphical representation of the selected sub-path being gated off. Thus, the other users must select the remaining non-gated sub-path to continue onward in the competition.

Tool 800 of server IHS 700 continues monitoring the sensed performance information transmitted from tools 1000 of the activity stations 105 to determine the first user to reach the goal 610. Tool 800 sends analyzed performance information to tools 1000 of the activity stations to indicate the first user to reach end goal 610. Tools 1000 of the activity stations receive the analyzed performance information and instruct displays 240 of the activity stations to display the positions of the users relative to one another at time T5 of FIG. 6C, namely when a user such as user 4 reaches end goal 610, as per block 1035. As other users reach end goal 610, tool 800 of server IHS 700 continues analyzing the received real-time performance information of the activity station users to determine final performance information relative to one another. This final performance information may include the numerical order in which users reached goal 610, the lapsed time associated with each user completing the course, the work expended by each user completing the course as well as other performance information. Tool 800 sends this final analyzed performance information to tool 1000 for display on displays 240 of the activity stations. The activity stations receive and display this final analyzed performance information, as per block 1035. The disclosed dynamic competition methodology ends at block 1040.

In an alternative embodiment of the dynamic competition methodology, multiple teams of users may compete against one another in a manner similar to that disclosed with reference to FIGS. 6A-FIG. 10, except that each user referenced in the discussion of FIGS. 6A-10 is replaced with a team or group of users. Thus, referring now to FIG. 6C, user 1 is a team of users, user 2 is another team of users, user team 3 is still another team of users and user team 4 is yet another team of users. Each user of each team employs a respective activity station 105. Each activity station 105 sends performance information of its respective user to tool 800 of server IHS 700. Tool 1000 and tool 800 operate as described above and tool 800 now analyzes the performance information from all of the activity stations 105 that are operated by users who are members of teams. However, when tool 800 determines that a particular user is first to reach an intermediate goal such as intermediate goal 615 of FIG. 6C, then tool 800 notifies tool 1000 to instruct that user to select a desired sub-path 631 or 632 on behalf of the entire team. In this scenario, if the particular user selects sub-path 631, then the particular user and his or her team members take the selected sub-path 631. Tool 800 instructs tool 1000 to display the selected sub-path 631 as being gated off to members of other teams. The users of the other teams may not take sub-path 631 and instead are routed to sub-path 631. When the particular user and respective team enter sub-path 631, they experience a different level of competition and/or difficultly level than experienced before entering sub-path 631. The competition level and/or difficulty level experienced by the different teams may again change after the next intermediate goal 620. Each sub-path may have different tradeoffs with respect to difficulty level due to sub-path length, incline, altitude above sea-level and other performance-affecting factors. Tool 800 monitors the sensed performance information from all activity stations of all users of the teams. When tool 800 determines that a particular user is the first user to reach end goal 610, then tool 800 informs the activity stations 105 that the team to whom the particular user belongs is the winning team of the competition. In the above-described manner, the competition level experienced by the users may dynamically vary as they participate in the competition from start 605 and past intermediate goals 615 and 620 on the way to end goal 610.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 8 and 10 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 8 and 10 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 8 and 10 described above.

The flowcharts of FIGS. 8 and 10 illustrate the architecture, functionality, and operation of possible implementations of systems, methods and computer program products that perform network analysis in accordance with various embodiments of the present invention. In this regard, each block in the flowcharts of FIGS. 8 and 10 may represent a module, segment, or portion of code, which comprises one or more executable instructions for implementing the specified logical function(s). It should also be noted that, in some alternative implementations, the functions noted in the block may occur out of the order noted in FIGS. 8 and 10. For example, two blocks shown in succession may, in fact, be executed substantially concurrently, or the blocks may sometimes be executed in the reverse order, depending upon the functionality involved. It will also be noted that each block of FIGS. 8 and 10 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
providing a plurality of activity stations to a plurality of users, wherein each user interacts with a respective activity station in pursuit of an end goal, wherein each activity station includes a client information handling system (IHS) and a display coupled thereto, thus providing a plurality of client IHSs;
receiving, by a dynamic competition management tool in a server IHS, end goal information that defines the end goal, the server IHS being coupled to the plurality of client IHSs via a communication network therebetween;
sensing, by each activity station, performance information of the respective user of the activity station in pursuit of the end goal, thus providing sensed performance information;
receiving, by the dynamic competition management tool, sensed performance information from each of the activity stations;
sending, by the dynamic competition management tool, a command to a user interactive device in a particular activity station to vary a level of difficulty that the user of the particular activity station experiences as the user of the particular activity station progresses toward the end goal;
receiving, by the dynamic competition management tool, intermediate goal information that defines an intermediate goal between a start point and the end goal, a path being defined between the start point and the intermediate goal;
receiving, by the dynamic competition management tool, sub-path information that defines a first sub-path between the intermediate goal and the end goal, the sub-path information further defining a second sub-path between the intermediate goal and the end goal;
determining, by the dynamic competition management tool, from the sensed performance information a particular user to first reach the intermediate goal on the path;
determining, by the dynamic competition management tool, from the sensed information relative positions of the other users on the path relative to the particular user;
sending, by the dynamic competition management tool, a command to display a position of the particular user reaching the intermediate goal relative to the other users.

2. The method of claim 1, further comprising:
receiving, by the dynamic competition management tool, a selection of the particular user of one of the first sub-path and the second sub-path, thus designated a selected sub-path and an unselected sub-path.

3. The method of claim 2, further comprising:
instructing, by the dynamic competition management tool, the user interactive device to exhibit a different level of difficulty to the particular user over the selected sub-path than the unselected sub-path.

4. The method of claim 3, further comprising:
instructing, by the dynamic competition management tool, the activity stations to display a gate closed indicator at the intermediate goal to indicate for the selected sub-path, thus preventing other users from taking the selected sub-path such that the other users take the unselected sub-path.

5. The method of claim 4, further comprising:
displaying, by the activity station, a course map indicating the relative positions of the users of the activity station as they progress from the start point over the path and sub-paths to the end goal.

* * * * *